United States Patent [19]

Dehnert et al.

[11] 4,231,746
[45] Nov. 4, 1980

[54] DYEING OF CELLULOSE-CONTAINING TEXTILE MATERIAL AND NOVEL DYES FOR USE THEREIN

[75] Inventors: Johannes Dehnert; Werner Juenemann, both of Ludwigshafen, Fed. Rep. of Germany

[73] Assignee: BASF Aktiengesellschaft, Ludwigshafen, Fed. Rep. of Germany

[21] Appl. No.: 68,566

[22] Filed: Aug. 22, 1979

[30] Foreign Application Priority Data

Aug. 28, 1978 [DE] Fed. Rep. of Germany ....... 2837500

[51] Int. Cl.³ .................. C09B 27/00; C09B 31/02
[52] U.S. Cl. ........................ 8/680; 260/174; 8/532
[58] Field of Search ............ 8/41 R, 54.2, 93

[56] References Cited

U.S. PATENT DOCUMENTS

| | | | |
|---|---|---|---|
| 3,667,897 | 6/1972 | Blackwell et al. | 8/21 C |
| 3,706,525 | 12/1972 | Blackwell et al. | 8/21 C |
| 3,711,245 | 1/1973 | Neumer | 8/21 R |
| 4,049,377 | 9/1977 | Schwab et al. | 8/21 C |
| 4,150,943 | 4/1979 | Dehnert et al. | 8/41 R |
| 4,154,577 | 5/1979 | Miederer et al. | 8/41 R |
| 4,157,893 | 6/1979 | Dehnert et al. | 8/41 R |

FOREIGN PATENT DOCUMENTS 54-22440 2/1979 Japan .

*Primary Examiner*—A. Lionel Clingman
*Attorney, Agent, or Firm*—Oblon, Fisher, Spivak, McClelland & Maier

[57] ABSTRACT

A process for dyeing cellulose-containing textile material, wherein a dye of the general formula I

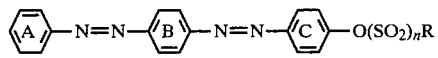

where R is an aliphatic, cycloaliphatic, araliphatic or aromatic radical and n is 0 or 1, and where the rings A, B and C may be substituted and may carry a fused ring, is used.

On cotton and especially on cotton/polyester union fabrics, the process according to the invention gives very fast, especially very lightfast, dyeings.

9 Claims, No Drawings

DYEING OF CELLULOSE-CONTAINING TEXTILE MATERIAL AND NOVEL DYES FOR USE THEREIN

The present invention relates to a process for dyeing cellulose-containing textile material, and to certain novel dyes for use in this process. According to the invention there is provided a process for dyeing cellulose-containing textile material, wherein a dye of the general formula I

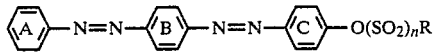

where R is an aliphatic, cycloaliphatic, araliphatic or aromatic radical and n is 0 or 1, and where the rings A, B and C may be substituted and/or may carry a fused ring, is used. A group of technically valuable compounds corresponds to formula I where the radical

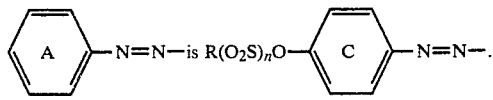

Examples of radicals R are alkenyl, $C_1$–$C_{12}$-alkyl, which may be interrupted by oxygen and may be substituted by hydroxyl, chlorine, bromine, unsubstituted or substituted carbamyl, cyano, $C_1$–$C_8$-alkoxy, $C_1$–$C_4$-alkanoyl, benzoyl, $C_1$–$C_4$-alkanolyloxy, phenoxy or unsubstituted or substituted phenyl (eg. tolyl or chlorophenyl), cycloalkyl of 5 to 8 carbon atoms, or unsubstituted or methyl-, ethyl- or chlorine-substituted phenyl.

Specific examples of R are: $CH_3$, $C_2H_5$, n—$C_3H_7$, n—$C_4H_9$, n—$C_6H_{13}$, $CH_2$—$CH(C_2H_5)C_4H_9$—n, n—$C_8H_{17}$, n—$C_{10}H_{21}$, n—$C_{12}H_{25}$, —$C_2H_4OCH_2CH(C_2H_5)C_4H_9$—n, $CH_2CH$=$CH_2$, —$C_2H_4Cl$, —$C_2H_4Br$, —$C_2H_4OCH_3$, —$C_2H_4OC_2H_5$, —$C_2H_4OC_6H_5$, —$C_6H_{11}$, —$C_6H_5$, —$C_6H_4CH_3$, —$C_6H_4Cl$, —$C_6H_4C_2H_5$, —$CH_2$—$C_6H_5$, —$CH_2$—$C_6H_4$—$CH_3$, —$CH_2C_6H_4Cl$, —$CH_2C_6H_3Cl_2$, $CH_2C_6H_4NO_2$, —$CH_2$—$C_6H_4CN$, —$C_2H_4C_6H_5$, —$C_3H_6C_6H_5$, $C_2H_4OC_6H_5$, —$C_3H_6$—$CN$, —$CH_2$—$CONH_2$, —$CH_2CON(CH_3)_2$, $CH_2CON(C_2H_5)_2$, $CH_2CONHC_6H_5$, —$CH_2CO_2CH_3$, —$CH_2CO_2C_2H_5$, —$CH_2CO_2C_4H_9$, —$CH_2$—$CO$—$CH_3$, $CO_2COC_6H_5$, —$CH_2$—$CH(OH)C_6H_5$, —$CH_2$—$CH(OH)CH_2OC_6H_5$, $CH_2CH(OH)C_2H_5$, —$C_2H_4OCOCH_3$, —$C_2H_4OCOC_3H_7$, —$CH_2CH(C_2H_5)OCOCH_3$, $CH_2CH(C_2H_5)OCOC_2H_5$,

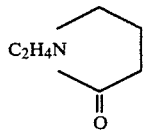

and —$C_2H_4OC_2H_4OC_6H_5$.

The ring B may, for example, be substituted by chlorine, bromine, methyl, ethyl, acetylamino, $C_1$–$C_4$-alkoxy or phenoxy or may carry a fused benzo ring which is itself unsubstituted or substituted by methoxy or ethoxy.

Examples of substituents for the ring C include chlorine, methyl, ethyl, methoxy, ethoxy, phenyl and acetylamino.

Examples of substituents of the ring A are chlorine, bromine, methyl, trifluoromethyl, ethyl, hydroxyl, methoxy, ethoxy, phenoxy, nitro, cyano, phenylazo which is unsubstituted or substituted by methyl, ethyl, O(—$SO_2$)$_n$R, chlorine, bromine, nitro or cyano, methylsulfonyl, ethyl-sulfonyl, phenylsulfonyl, $SO_2OR$, $COOR$,

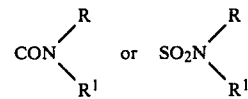

Examples of radicals $R^1$ are hydrogen. $C_1$–$C_4$-alkyl and hydroxyl-substituted or $C_1$–$C_4$-alkoxy-substituted $C_2$- or $C_3$-alkyl.

Certain of the dyes are novel compounds, in particular those which have the formula I where R is a cycloaliphatic, araliphatic or aromatic radical. Araliphatic radicals R are preferred.

A compound of the formula I may be prepared by introducing the radical R or $RSO_2$ into a compound of the formula II

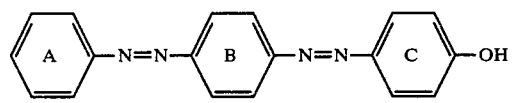

Conventional methods may be used. For example, suitable reactants for alkylating the phenolic OH group are unsubstituted and substituted alkylene oxides, unsubstituted and substituted alkyl chlorides and bromides, unsubstituted and substituted dialkyl sulfates and unsubstituted and substituted esters of aliphatic and aromatic sulfonic acids.

The etherificational manner, for example, in an aqueous-alkaline medium, in an alkaline, aqueous-organic medium or in an anhydrous organic solvent, in the presence of an acid-binding agent. The reaction is most advantageously carried out at from 50° to 160° C., and in the case of low-boiling alkylating agents or solvents an autoclave is used, where necessary.

Details of the method of preparation may be found in the Examples, where parts and percentages are by weight, unless stated otherwise.

Suitable dyeing methods for applying the dyes of the formula I are, in particular, those described in German Pat. No. 1,811,796 and German Laid-Open Applications Nos. DOS 2,524,243 and DOS 2,528,743, i.e. by contacting the cellulose-containing textile material with water and an oxyethylene or oxypropylene compound to swell the cellulose fibers and, simultaneously or subsequently whilst the fibers are still swollen with the dye.

EXAMPLE 1

17.6 parts of the dye C.I. Disperse Orange 13, 6.9 parts of potassium carbonate, 13 parts of 2-phenyl-ethyl bromide and 0.2 part of potassium iodide in 120 parts of ethanol are refluxed for 5 hours. The product is filtered off at room temperature and washed with ethanol and with water; 16 parts of the dye of the formula

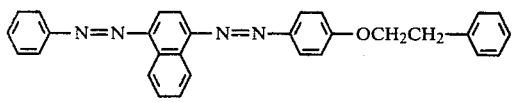

are obtained.

10 parts of this dye are mixed with 100 parts of polyethylene oxide of molecular weight 300 and 790 parts of a 3% strength alginate thickener base to give an ink, with which a cotton fabric is printed by rotary screen printing. The fabric is then dried at 100° C., treated with hot air at 200° C. for 1 minute, rinsed cold, soaped at the boil, again rinsed cold and dried. A light-fast and washfast brownish orange print on a white ground is obtained.

EXAMPLE 2

52 parts of C.I. Disperse Orange 55, 103 parts of potassium carbonate, 116.6 parts of β-phenoxyethyl chloride and 0.2 part of sodium iodide, in a mixture of 240 parts of methyl ethyl ketone and 300 parts of N-methylpyrrolidone, are stirred for 5 hours at 100° C. The batch is then stirred into water and the precipitate is filtered off, washed with water and dried. 71 parts of the dye of the formula

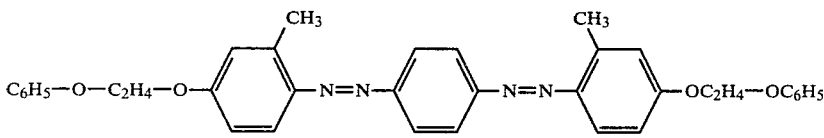

are obtained.

A 65:35 (weight/weight) polyester/cotton union fabric is treated with a paste which comprises 20 parts of the above dye, 120 parts of a reaction product of polyethylene oxide of molecular weight 300 with boric acid in the molar ratio of 3:1 and 860 parts of a 10% strength alginate thickener base. The print is dried at 105° C. and then treated for 6 minutes with live steam at 180° C. It is then rinsed with cold water, soaped at 80° C., rinsed cold and dried. A lightfast and washfast yellowish orange print on a white ground is obtained.

EXAMPLE 3

40 parts of a 45% strength aqueous paste of C.I. Disperse Orange 55 are stirred into 500 parts of N-methylpyrrolidone. 25 parts of benzene sulfochloride and simultaneously, 60 parts by volume of 10% strength sodium hydroxide solution are added dropwise at 0°–20° C. After stirring for 1 hour, a further 50 parts of benzene sulfochloride are added. After a few hours, the product is filtered off cold, washed with alcohol and dried. 33.5 parts of the dye of the formula

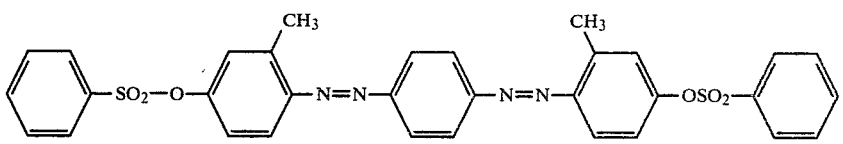

are obtained.

A cotton fabric is roller-printed with a print paste which comprises 15 parts of the above dye, 110 parts of polyethylene oxide of molecular weight 350, 30 parts of oleic acid diethanolamide and 845 parts of a 10% strength alginate thickener base. The print is dried at 100° C. and is then fixed by treatment with hot air at 195° C. for 1 minute. After finishing as described in Example 1, a very fast yellow print on a white ground is obtained.

The following dyes are obtained similarly, and when applied to cotton and union fabric by the above methods give very fast dyeings.

| Example | Formula | Hue |
|---|---|---|
| 4 | CH₃–⌬–SO₂O–(CH₃)⌬–N=N–⌬–N=N–(CH₃)⌬–OSO₂–⌬–CH₃ | yellow |
| 5 | H₃C–⌬–SO₂O–(CH₃)⌬–N=N–⌬–N=N–(CH₃)⌬–OSO₂–⌬–CH₃ | " |
| 6 | (CH₃)⌬–SO₂O–(CH₃)⌬–N=N–⌬–N=N–(CH₃)⌬–OSO₂–(CH₃)⌬ | " |
| 7 | ⌬–N=N–⌬–N=N–(CH₃)⌬–OSO₂–⌬(CH₃) | " |
| 8 | ⌬–N=N–[naphthyl]–N=N–⌬–OSO₂–⌬(CH₃) | brownish yellow |

| Example | Formula | Hue |
|---|---|---|
| 9 | Ph—SO₂O—(2-CH₃-C₆H₃)—N=N—C₆H₄—N=N—C₆H₄—N=N—(2-CH₃-C₆H₃)—OSO₂—Ph | yellow |
| 10 | (CH₃)C₆H₄—SO₂O—(2-CH₃-C₆H₃)—N=N—C₆H₄—N=N—C₆H₄—N=N—(2-CH₃-C₆H₃)—OSO₂—C₆H₄(CH₃) | " |
| 11 | O₂N—C₆H₄—N=N—C₆H₄—N=N—(2,5-(OC₂H₅)₂-C₆H₂)—N=N—(2-CH₃-C₆H₃)—OSO₂—Ph | brown |
| 12 | O₂N—(2-OCH₃-C₆H₃)—N=N—(2,5-(OCH₃)(H₃CO)-C₆H₂)—N=N—(2-CH₃-C₆H₃)—OSO₂—Ph | reddish brown |
| 13 | O₂N—(2,5-Cl₂-C₆H₂)—N=N—(2,5-(OCH₃)₂-C₆H₂)—N=N—(2-CH₃-C₆H₃)—OSO₂—Ph | reddish brown |
| 14 | (2-CH₃-C₆H₄)—SO₂O—(2-CH₃-C₆H₃)—N=N—C₆H₄—N=N—C₆H₄—N=N—(2-CH₃-C₆H₃)—OSO₂—(2-CH₃-C₆H₄) | yellow |
| 15 | H₃C—C₆H₄—N=N—(2-CH₃-C₆H₃)—N=N—C₆H₄—N=N—C₆H₄—N=N—(2-CH₃-C₆H₃)—OSO₂—C₆H₄—CH₃ | yellow |
| 16 | Ph—N=N—C₆H₄—N=N—(2-CH₃-C₆H₃)—OSO₂—Ph | yellow |
| 17 | Ph—N=N—C₆H₄—N=N—(2-CH₃-C₆H₃)—OSO₂—C₆H₄—CH₃ | yellow |
| 18 | Ph—N=N—C₆H₄—N=N—(2-CH₃-C₆H₃)—OSO₂—(2-CH₃-C₆H₄) | yellow |

EXAMPLE 19

A mixture of 90 parts of the dye of the formula

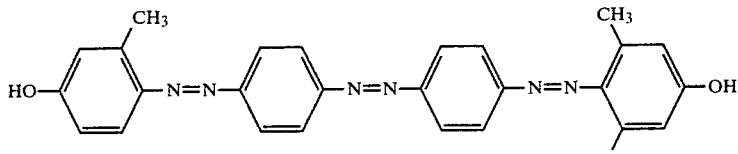

600 parts of N-methylpyrrolidone, 56 parts of potassium carbonate and 88.3 parts of benzyl chloride is stirred for 3 hours at 80° C. 750 parts of water are added at room temperature and the precipitate is filtered off, washed with water and dried; 100 parts of the dye of the formula

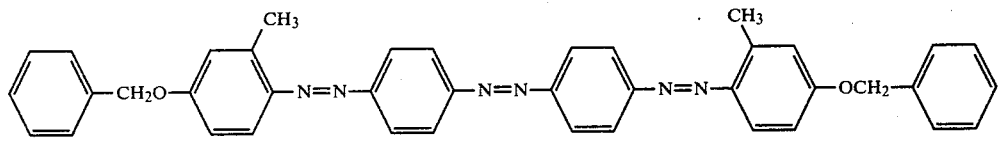

are obtained.

A 65:35 (weight/weight) polyester/cellulose union fabric is screen-printed with an ink which comprises 30 parts of the dye of the above structure, 100 parts of a reaction product of polyethylene oxide of molecular weight 300 with boric acid, in a molar ratio 3:1, 30 parts of oleic acid diethanolamide and 840 parts of a 3% strength alginate thickener base, and the print is dried at 110° C. It is then treated with live steam at 185° C. for 5 minutes and is finished as described in Example 2. A fast orange print on a white ground is obtained.

The dyes mentioned in the Examples which follow can be converted to a commercial dye formulation as follows:

30 parts of dye, 6 parts of dispersant, 10 parts of humectant, 1 part of disinfectant and about 53 parts of water are milled in a stirred ball mill until the particle size is about 0.5 μm. The dye dispersion thus obtained has a food shelf life.

The substituents $T^1$ to $T^8$ of the dyes listed in the Table which follows and the indices which precede the substituents in the columns of the Table, correspond to the formula (III).

| Example | T¹ | T² | T³ | T⁴ | T⁵ | T⁶ | T⁷ | T⁸ | Hue |
|---|---|---|---|---|---|---|---|---|---|
| 20 | H | H | H | H | H | 3-CH₃ | H | OC₁₂H₂₅(n) | yellow |
| 21 | " | " | " | " | " | " | " | OC₂H₄C₆H₅ | " |
| 22 | " | " | " | " | " | " | " | OCH(CH₃)CH₂C₆H₅ | " |
| 23 | " | " | " | " | " | " | " | OCH₂CONH₂ | " |
| 24 | " | " | " | " | " | " | " | OCH₂COC₆H₅ | " |
| 25 | 2-CH₃ | OCH₂C₆H₅ | " | " | " | 2-CH₃ | " | OCH₂C₆H₅ | golden yellow |
| 26 | " | OCH₂CN | " | " | " | " | " | OCH₂CN | golden yellow |
| 27 | " | OC₂H₄C₆H₅ | " | " | " | " | " | OC₂H₄C₆H₅ | golden yellow |
| 28 | " | " | " | " | " | " | " | OC₂H₄OC₆H₅ | golden yellow |
| 29 | " | OC₈H₁₇-n | " | " | " | " | " | OC₈H₁₇—N | golden yellow |
| 30 | H | H | " | " | " | " | " | OC₁₂H₂₅-n | golden yellow |
| 31 | " | " | " | " | " | " | " | OC₂H₄C₆H₅ | golden yellow |
| 32 | " | " | " | " | " | " | " | OCH₂CONHC₆H₅ | golden yellow |
| 33 | " | " | " | " | " | 3-CONH₂ | " | OC₂H₄C₆H₅ | yellow |
| 34 | " | " | " | " | " | 3-Cl | " | OCH₂C₆H₅ | golden yellow |
| 35 | " | " | " | " | " | 2-Cl | " | " | golden yellow |
| 36 | " | " | " | 2-CH₃ | 5-OCH₃ | " | 5-Cl | " | yellowish brown |
| 37 | " | " | " | " | " | " | " | OCH₂COC₆H₅ | yellowish brown |
| 38 | " | " | " | " | " | " | " | OCH₂CONH₂ | brownish yellow |
| 39 | " | " | " | " | " | " | " | OCH₂C₆H₄—(p-)NO₂ | brownish yellow |
| 40 | " | " | " | 2-Cl | H | " | " | OC₂H₄C₆H₅ | golden yellow |
| 41 | " | " | " | " | " | " | " | OC₂H₄OC₆H₅ | golden yellow |
| 42 | " | " | " | 2-Br | 6-Br | 2-CH₃ | " | OCH₂COC₆H₅ | brownish yellow |
| 43 | " | " | " | " | " | H | " | OC₂H₄C₆H₅ | brownish yellow |
| 44 | " | OC₆H₅ | " | 2-OCH₃ | 5-OCH₃ | " | " | OC₂H₄C₆H₅ | reddish orange |
| 45 | " | " | " | " | " | " | " | OCOC₆H₅ | " |
| 46 | " | " | " | " | " | " | " | OCONH₂ | reddish orange |
| 47 | " | " | " | " | " | " | " | OCH₂C₆H₄—NO₂-p | reddish orange |
| 48 | " | " | " | " | " | " | " | OCH₂CH(C₂H₅)C₄H₉-p | reddish orange |
| 49 | " | " | " | 2-CH₃ | 5-CH₃ | " | " | OCH₂C₆H₅ | brownish yellow |
| 50 | " | " | " | " | " | " | " | OCH₂COC₆H₅ | brownish yellow |
| 51 | " | " | " | " | " | " | " | OC₂H₄C₆H₅ | brownish yellow |
| 52 | " | " | " | H | H | " | " | " | brownish yellow |
| 53 | 2-OH | H | 5-CH₃ | " | " | 2-CH₃ | " | OCH₂C₆H₅ | brownish yellow |
| 54 | " | " | " | " | " | " | " | OC₂H₄C₆H₅ | brownish yellow |
| 55 | " | " | " | " | " | " | " | OCH₂—CH(CH₃)C₆H₅ | brownish |

-continued

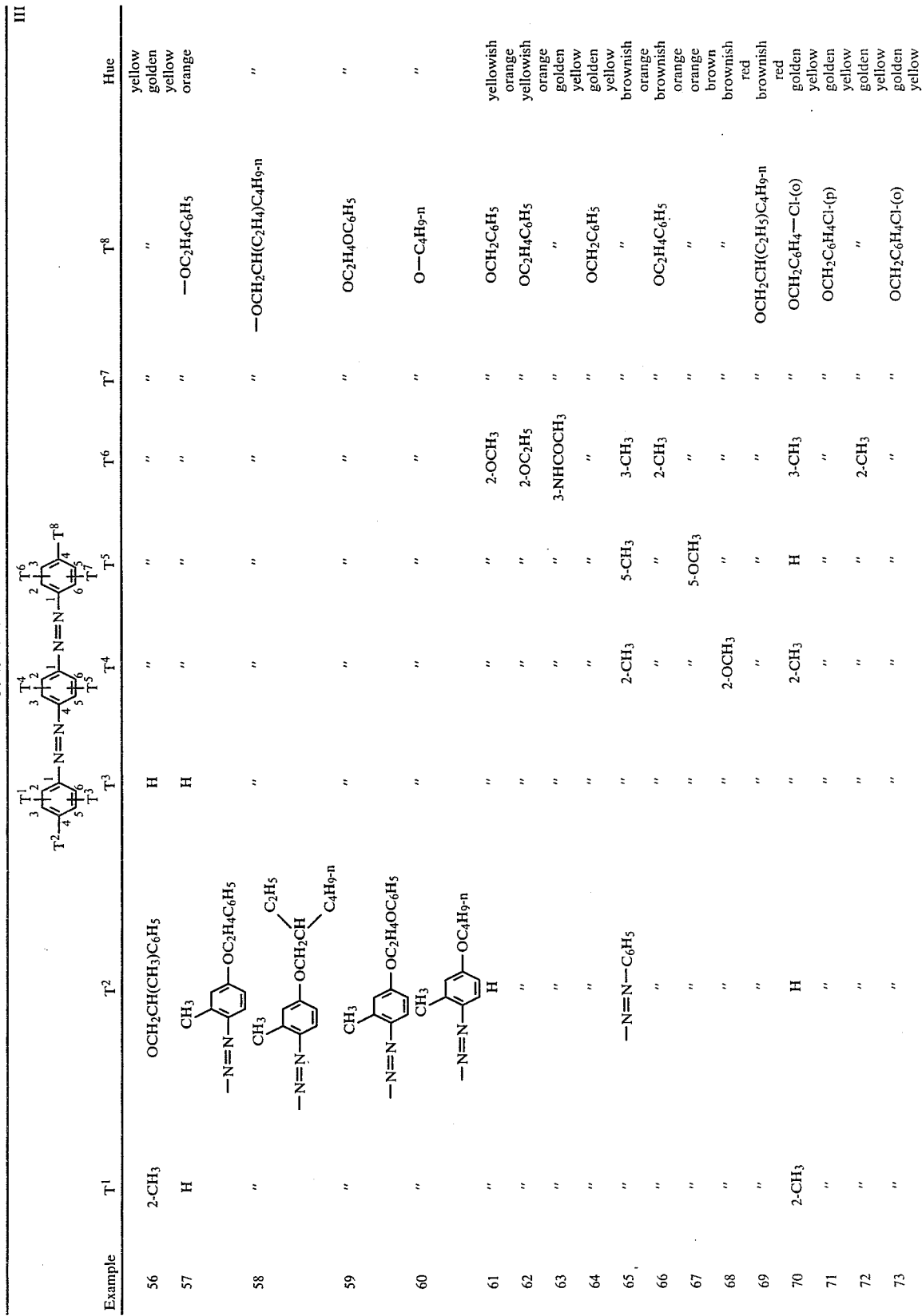

| Example | T¹ | T² | T³ | T⁴ | T⁵ | T⁶ | T⁷ | T⁸ | Hue |
|---|---|---|---|---|---|---|---|---|---|
| 56 | 2-CH₃ | OCH₂CH(CH₃)C₆H₅ | H | | | | | | yellowish golden yellow |
| 57 | H | -N=N-$\begin{array}{c}\text{CH}_3\\ \text{OC}_2\text{H}_4\text{C}_6\text{H}_5\end{array}$ | H | | | | | -OC₂H₄C₆H₅ | yellow orange |
| 58 | " | -N=N-$\begin{array}{c}\text{CH}_3\\ \text{OCH}_2\text{CH}\begin{array}{c}\text{C}_2\text{H}_5\\ \text{C}_4\text{H}_9\text{-n}\end{array}\end{array}$ | " | | | | " | -OCH₂CH(C₂H₅)C₄H₉-n | " |
| 59 | " | -N=N-$\begin{array}{c}\text{CH}_3\\ \text{OC}_2\text{H}_4\text{OC}_6\text{H}_5\end{array}$ | " | | | | " | OC₂H₄OC₆H₅ | " |
| 60 | " | -N=N-$\begin{array}{c}\text{CH}_3\\ \text{OC}_4\text{H}_9\text{-n}\end{array}$ | " | | | | " | O-C₄H₉-n | " |
| 61 | " | H | " | | | 2-OCH₃ | " | OCH₂C₆H₅ | yellowish orange |
| 62 | " | " | " | | | 2-OC₂H₅ | " | OC₂H₄C₆H₅ | yellowish orange |
| 63 | " | " | " | | | 3-NHCOCH₃ | " | " | golden yellow |
| 64 | " | " | " | | | " | " | OCH₂C₆H₅ | golden yellow |
| 65 | " | " | " | 2-CH₃ | 5-CH₃ | 3-CH₃ | " | " | brownish orange |
| 66 | " | " | " | " | | 2-CH₃ | " | OC₂H₄C₆H₅ | brownish orange |
| 67 | " | " | " | " | 5-OCH₃ | " | " | " | brown |
| 68 | " | " | " | 2-OCH₃ | | " | " | " | brownish red |
| 69 | " | " | " | | | " | " | OCH₂CH(C₂H₅)C₄H₉-n | brownish red |
| 70 | 2-CH₃ | H | " | 2-CH₃ | H | 3-CH₃ | " | OCH₂C₆H₄—Cl-(o) | golden yellow |
| 71 | " | " | " | " | " | " | " | OCH₂C₆H₄Cl-(p) | yellow |
| 72 | " | " | " | " | " | 2-CH₃ | " | " | golden yellow |
| 73 | " | " | " | " | " | " | " | OCH₂C₆H₄Cl-(o) | golden yellow |

| Example | T¹ | T² | T³ | T⁴ | T⁵ | T⁶ | T⁷ | T⁸ | Hue |
|---|---|---|---|---|---|---|---|---|---|
| 74 | " | " | " | " | " | " | " | OCH₂COC₆H₅ | golden yellow |
| 75 | H | " | " | H | " | 2-NHCOCH₃ | " | OCH₂C₆H₅ | golden yellow |
| 76 | " | " | " | " | " | 2-Cl | 5-Cl | " | golden yellow |
| 77 | " | " | " | 2-OCH₃ | 5-OCH₃ | H | H | OCH₂COC₆H₅ | golden yellow |
| 78 | " | " | " | 2-OCH₃ | " | 2-CH₃ | " | —O—CH₂C₆H₅ | golden yellow |
| 79 | " | OC₂H₄C₆H₅ | " | " | " | " | " | —OC₂H₄C₆H₅ | brownish orange |
| 80 | " | " | " | " | " | " | " | —OC₂H₄OC₆H₅ | brownish orange |
| 81 | " | " | " | " | " | " | " | OCH₂CH(C₂H₅)C₄H₉-(n) | brownish orange |
| 82 | " | OC₂H₄C₆H₅ | " | " | " | " | " | OCH₂CH(CH₃)C₆H₅ | brownish orange |
| 83 | " | " | " | " | " | " | " | OC₆H₁₃-(n) | brownish orange |
| 84 | " | " | " | 2-CH₃ | " | " | " | OC₂H₄C₆H₅ | yellowish brown |
| 85 | " | " | " | " | 5-CH₃ | " | " | " | brownish yellow |
| 86 | " | —OC₂H₄C₆H₅ | " | " | 5-OCH₃ | " | " | " | brownish yellow |
| 87 | " | H | " | 2-OCH₃ | H | H | " | OCH₂COC₆H₅ | golden yellow |
| 88 | " | " | " | " | " | " | " | OCH₂CH(CH₃)C₆H₅ | golden yellow |
| 89 | " | —NO₂ | " | " | " | " | " | OC₂H₄C₆H₅ | orange |
| 90 | " | —OCH₂C₆H₅ | " | " | " | " | " | OC₂H₄C₆H₅ | orange |
| 91 | " | OCH₂COC₆H₅ | " | " | " | " | " | OCH₂COC₆H₅ | orange |
| 92 | " | OC₂H₄C₆H₅ | " | " | " | " | " | OCH₂C₆H₅ | brownish yellow |
| 93 | " | " | " | " | " | " | " | OCH₂COC₆H₅ | brownish yellow |
| 94 | " | OC₂H₄C₆H₅ | " | " | " | " | " | OC₂H₄C₆H₅ | yellowish brown |
| 95 | 2-CH₃ | " | " | " | " | 2-CH₃ | " | — | yellowish brown |
| 96 | " | OC₆H₁₃-n | " | " | " | " | " | OC₆H₁₃-n | yellowish brown |
| 97 | " | OCH₂CH(CH₃)C₆H₅ | " | " | " | " | " | OCH₂CH(CH₃)C₆H₅ | yellowish brown |
| 98 | " | OC₂H₄OC₆H₅ | " | " | " | " | " | OC₂H₄OC₆H₅ | yellowish brown |

-continued

| Example | T¹ | T² | T³ | T⁴ | T⁵ | T⁶ | T⁷ | T⁸ | Hue |
|---|---|---|---|---|---|---|---|---|---|
| 99 | " | OC₂H₄OC₆H₅ | " | 2-CH₃ | 5-OCH₃ | " | " | OC₂H₄C₆H₅ | brown |
| 100 | " | OCH₂CH(CH₃)C₆H₅ | " | " | " | " | " | OCH₂CH(CH₃)C₆H₅ | yellowish brown |
| 101 | 2-SO₂C₆H₅ | H | " | " | 5-CH₃ | H | " | OCH₂C₆H₅ | yellowish brown |
| 102 | " | " | " | " | " | " | " | OC₂H₄C₆H₅ | brownish yellow |
| 103 | " | " | " | " | " | " | " | " | yellow brownish |
| 104 | " | " | " | " | " | 2-CH₃ | " | OCH₂CH(C₂H₅)C₄H₉-n | yellow brownish |
| 105 | 2-OCH₃ | " | —SO₂N(C₂H₅)₂ | 2-OCH₃ | 5-OCH₃ | H | " | OCH₂C₆H₅ | yellow reddish orange |
| 106 | " | " | " | " | " | " | " | OC₂H₄C₆H₅ | reddish orange |
| 107 | " | " | " | " | " | 2-CH₃ | " | " | orange |
| 108 | " | " | " | 2-CH₃ | 5-CH₃ | " | " | " | yellowish orange |
| 109 | " | " | " | " | " | " | " | —OCH₂CH(CH₃)₂ | yellowish orange |
| 110 | " | " | " | " | " | " | " | OCH₂C₆H₅ | yellowish orange |
| 111 | " | " | " | " | " | H | " | OC₂H₄C₆H₅ | yellowish orange |
| 112 | " | " | " | 2-OCH₃ | " | 2-CH₃ | 5-Cl | " | orange |
| 113 | H | " | H | 2-Br | " | 2-Cl | 6-CH₃ | " | orange yellow |
| 114 | " | " | " | " | " | 2-CH₃ | " | " | brownish yellow |
| 115 | 2-Cl | —NO₂ | 6-Cl | 2-OCH₃ | 5-OCH₃ | " | H | OCO₂C₆H₅ | brown |
| 116 | " | " | " | " | " | " | " | OCH₂CH(CH₃)C₆H₅ | " |
| 117 | " | " | " | " | " | 2-Cl | 5-Cl | OC₂H₄C₆H₅ | " |
| 118 | H | O-C₆H₅ | H | 2-CH₃ | " | " | " | " | yellowish brown |
| 119 | " | " | " | " | " | 2-CH₃ | H | " | orange |
| 120 | " | OCH₃ | " | 2-OCH₃ | " | 3-C₆H₅ | " | OCH₂C₆H₅ | " |
| 121 | " | " | " | " | " | " | " | " | " |
| 122 | " | CONHC₃H₆OC₂H₄OC₆H₅ | " | " | " | 2-CH₃ | 5-H | " | reddish orange |
| 123 | " | " | " | " | " | " | " | OC₂H₄C₆H₅ | reddish orange |
| 124 | " | " | " | " | " | " | " | OC₂H₅ | reddish orange |
| 125 | " | " | " | " | " | " | " | OCH₂—CH—OH₂ | reddish orange |

-continued

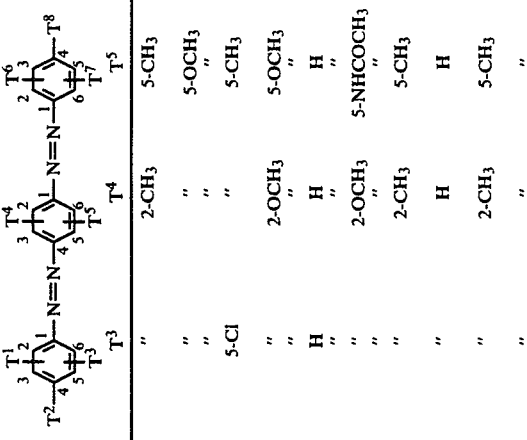

III

| Example | T¹ | T² | T³ | T⁴ | T⁵ | T⁶ | T⁷ | T⁸ | Hue |
|---|---|---|---|---|---|---|---|---|---|
| 126 | " | " | " | 2-CH₃ | 5-CH₃ | H | " | OCH₂C₆H₅ | golden yellow |
| 127 | " | " | " | " | 5-OCH₃ | 2-CH₃ | " | " | orange |
| 128 | 2-OCH₃ | —OCH₃ | 5-Cl | " | 5-CH₃ | " | " | OC₂H₄C₆H₅ | orange |
| 129 | " | " | " | " | " | " | " | OCH₂C₆H₄—NO₂-(p) | golden yellow |
| 130 | 2-OC₆H₅ | H | " | 2-OCH₃ | 5-OCH₃ | 2-CH₃ | " | OC₂H₄C₆H₅ | orange |
| 131 | " | " | " | " | " | " | " | OC₂H₄OC₆H₅ | orange |
| 132 | H | " | H | H | H | 3-C₆H₅ | " | OC₂H₄C₆H₅ | yellow |
| 133 | " | " | " | " | " | " | " | " | " |
| 134 | " | —OCH₃ | " | 2-OCH₃ | 5-NHCOCH₃ | 2-CH₃ | " | OC₂H₄C₆H₅ | orange |
| 135 | " | " | " | " | " | " | " | OCH₂CH₂OC₆H₅ | " |
| 136 | " | —SO₂N(C₂H₅)₂ | " | 2-CH₃ | 5-CH₃ | " | " | OC₂H₄C₆H₅ | golden yellow |
| 137 | " | —NO₂ | " | H | H | 2-C₆H₅ | " | " | golden yellow |
| 138 | H | CONHC₃H₆OC₂H₄OC₆H₅ | " | 2-CH₃ | 5-CH₃ | 2-CH₃ | " | " | golden yellow |
| 139 | " | " | " | " | " | " | " | OCH₃ | golden yellow |
| 140 | 2-OCH₃ | H | " | 2-NHCOCH₃ | H | " | " | " | brownish yellow |
| 141 | H | —OC₂H₅ | " | " | " | " | " | " | brownish yellow |
| 142 | " | —N=N—C₆H₅ | " | 2-CH₃ | 5-CH₃ | 2-CH₃ | " | OCH₂CH(OH)CH₂OC₆H₅ | orange |
| 143 | " | " | " | " | " | " | " | OC₂H₄OC₂H₄OCH₃ | brownish orange |
| 144 | " | " | " | " | " | " | " | OC₂H₄-Br | brownish orange |
| 145 | " | " | " | " | " | " | " | OCH₂COCH₃ | brownish orange |
| 146 | " | 41 | " | " | " | " | " | O(CH₂)₃Cl | brownish orange |
| 147 | " | OC₂H₅ | " | " | " | " | " | OCH₂CH(C₂H₅)OCOC₃H₇ | brownish yellow |
| 148 | " | " | " | H | H | "" | " | OC₂H₄OCOCH₃ | orange |
| 149 | 2-OCH₃ | O-C₄H₉-n | " | " | " | " | OC₄H₉-n | golden | golden yellow |
| 150 | " | OC₂H₄CH(CH₃)₂ | " | " | " | " | " | OC₂H₄CH(CH₃)₂ | yellow |
| 151 | " | OC₂H₄OCH₃ | " | " | " | " | " | OC₂H₄OCH₃ | golden yellow |
| 152 | " | OC₂H₄OC₂H₅ | " | " | " | " | " | OC₂H₄OC₂H₅ | golden yellow |
| 153 | " | OC₂H₄OC₃H₆(n) | " | " | " | " | " | OC₂H₄OC₃H₆(n) | golden yellow |

-continued

| Example | $T^1$ | $T^2$ | $T^3$ | $T^4$ | $T^5$ | $T^6$ | $T^7$ | $T^8$ | Hue |
|---|---|---|---|---|---|---|---|---|---|
| 154 | " | $OC_2H_4OC_4H_9(n)$ | | | | | | $OC_2H_4OC_4H_9(n)$ | yellow |
| 155 | H | $-N=N-C_6H_5$ | | 2-$CH_3$ | 5-$CH_3$ | 3-$OC_2H_5$ | H | $OC_9H_{19}$-(n) | golden yellow |
| 156 | " | " | | " | " | 2-$CH_3$ | 5-Cl | $OC_6H_{13}$-(n) | yellow |
| 157 | " | " | | " | " | 2-$C_2H_5$ | 6-$C_2H_5$ | $OC_6H_{13}$-(n) | orange |
| 158 | " | $-OC_6H_5$ | | " | " | 2-$CH_3$ | H | $OCH_2CH(OH)C_6H_5$ | brownish orange |
| 159 | " | " | | " | " | " | " | $OCH_2CO_2C_4H_9$ | golden yellow |
| 160 | " | " | | " | " | " | " | $OCH_2COCH_3$ | yellow |
| 161 | " | $-NO_2$ | | 2-$OC_6H_5$ | H | " | " | $OCH_2C_6H_5$ | golden yellow |
| 162 | " | " | | 2-$OC_4H_9$ | 5-$OC_4H_9$ | " | " | $OCH_2C_6H_5$ | orange |
| 163 | " | $-OC_6H_5$ | | 2-$OC_2H_5$ | 5-$OC_2H_5$ | " | " | $-OCH_2C_6H_5$ | red |
| 164 | " | CN | | 2-$OCH_3$ | 5-$CH_3$ | 2-$CH_3$ | " | | brownish orange |
| 165 | 2-$CF_3$ | H | | 2-$CH_3$ | " | 2-$CH_3$ | " | " | orange |
| 166 | 2-Br | $-SO_2CH_3$ | | 2-$OCH_3$ | " | " | " | " | brownish orange |
| 167 | 2-Cl | $-SO_2C_6H_5$ | | " | " | " | " | " | yellow |
| 168 | H | H | | 2-$CH_3$ | " | " | " | " | yellow |
| 169 | 2-$CO_2C_{10}H_{21}$(n) | $OC_6H_5$ | | 2-$CH_3$ | 5-$OCH_3$ | 2-Cl | 5-Cl | $OCH_2C_6H_5$ | orange |
| 170 | H | $OCH_3$ | | 2-$OCH_3$ | 5-$NHCOCH_3$ | " | " | $OC_2H_4OC_6H_5$ | yellow |
| 171 | " | " | | " | " | " | " | " | yellowish brown |
| 172 | " | $OC_2H_5$ | | " | " | " | " | $OC_2H_4C_6H_5$ | yellowish brown |
| 173 | " | " | | " | " | " | " | $OC_2H_4OC_6H_5$ | yellowish brown |
| 174 | " | $OCH_3$ | | " | " | 2-$CH_3$ | H | $OC_2H_4OC_2H_4OC_6H_5$ | orange |
| 175 | " | $OC_2H_4OC_6H_5$ | | " | " | " | " | $OC_2H_4OC_6H_5$ | " |
| 176 | " | H | | H | H | " | " | $OC_2H_4OC_2H_4OC_6H_5$ | golden yellow |
| 177 | " | ![structure with $-N=N-$, $CH_3$, $(OC_2H_4)_2OC_6H_5$] | | " | " | " | " | " | orange |
| 178 | 2-$OCH_3$ | ![structure with $-N=N-$, $CH_3$, $OC_2H_4OC_6H_5$] | | 2-$OCH_3$ | 5-$CH_3$ | " | " | $OC_2H_4OC_6H_5$ | brownish orange |

-continued

III

| Example | T¹ | T² | T³ | T⁴ | T⁵ | T⁶ | T⁷ | T⁸ | Hue |
|---|---|---|---|---|---|---|---|---|---|
| 179 | " | $-N=N-\underset{CH_3}{\bigcirc}-OC_2H_4C_6H_5$ | " | " | " | " | " | $OC_2H_4C_6H_5$ | brownish orange |
| 180 | H | " | " | " | " | " | " | " | brownish orange |
| 181 | " | $-N=N-\underset{CH_3}{\bigcirc}-OC_2H_4OC_6H_5$ | " | 2-CH₃ | " | " | " | $OC_2H_4OC_6H_5$ | orange |
| 182 | " | " | " | " | " | " | " | " | " |
| 183 | " | " | " | 2-OCH₃ | 5-OCH₄ | " | " | " | reddish orange |
| 184 | 2-OCH₃ | " | " | " | " | " | " | " | reddish orange |
| 185 | " | " | " | " | 5-NHCOCH₃ | " | " | " | reddish orange |
| 186 | H | " | " | 2-NHCOCH₃ | H | " | " | " | orange |
| 187 | 2-OCH₃ | " | " | " | 5-OCH₃ | " | " | " | brownish yellow |
| 188 | " | " | " | " | " | " | " | " | brownish yellow |
| 189 | " | —OCH₃ | " | " | " | " | " | " | brownish yellow |
| 190 | " | " | " | " | " | " | " | $OC_2H_4C_6H_5$ | brownish yellow |
| 191 | H | " | " | " | " | " | " | " | brownish yellow |
| 192 | " | " | " | " | " | " | " | $OC_2H_4OC_6H_5$ | brownish yellow |
| 193 | " | OC₂H₅ | " | " | " | " | " | $O(C_2H_4O)_2C_6H_5$ | brownish yellow |
| 194 | " | —OCH₃ | " | " | " | " | " | $OC_2H_4OC_6H_5$ | brownish yellow |
| 195 | " | " | " | 2-OCH₃ | 5-CH₃ | 2-Cl | " | " | orange brown |
| 196 | 2-OCH₃ | $-N=N-\underset{CH_3}{\bigcirc}-OC_2H_4OC_6H_5$ | " | 2-NHCOCH₃ | H | " | 5-Cl | " | brownish yellow |
| 197 | H | H | 5-Cl | 2-OCH₃ | 5-OCH₃ | 2-CH₃ | H | " | brownish yellow |
| 198 | 2-OC₆H₅ | " | " | " | " | 2-Cl | 5-Cl | $OC_2H_4OC_6H_5$ | brownish yellow |
| 199 | " | " | " | " | 5-CH₃ | " | " | " | brownish yellow |
| 200 | " | " | " | " | " | 2-CH₃ | H | " | yellowish |

-continued

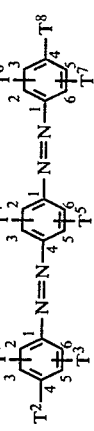

| Example | T¹ | T² | T³ | T⁴ | T⁵ | T⁶ | T⁷ | T⁸ | Hue |
|---|---|---|---|---|---|---|---|---|---|
| 201 | " | " | H | " | " | " | " | OC₂H₄OC₆H₅ | brown yellowish |
| 202 | " | " | 5-Cl | " | " | 2-Cl | 5-Cl | " | brown brownish yellow |
| 203 | " | " | " | " | 5-OCH₃ | 2-CH₃ | 5-CH₃ | " | yellowish brown |
| 204 | 2-OC₂H₅ | OC₂H₄C₆H₅ | H | 2-OCH₃ | " | " | H | O(C₂H₄)₂C₆H₅ | orange |
| 205 | 2-CH₃ | OC₂H₄OC₆H₅ | H | " | " | " | " | OC₂H₄C₆H₅ | " |
| 206 | " | " | " | 2-Br | 6-Br | " | " | OC₂H₄OC₆H₅ | " |
| 207 | " | OC₂H₄C₆H₅ | " | " | " | " | " | " | yellowish brown |
| 208 | " | " | " | 2-Cl | 5-Cl | " | " | OC₂H₄C₆H₅ | brownish yellow |
| 209 | " | O(C₂H₄O)₂C₆H₅ | " | " | " | " | " | O(C₂H₄O)₂C₆H₅ | brownish yellow |
| 210 | 2-OCH₃ | OC₂H₄OC₆H₅ | 5-OCH₃ | " | 5-CH₃ | 2-CH₃ | " | " | orange |
| 211 | " | —N=N— phenyl-OC₂H₄C₆H₅ | " | 2-OCH₃ | 5-OCH₃ | " | " | " | reddish |
| 212 | " | " | 5-CH₃ | " | " | " | " | OC₂H₄C₆H₅ | " |
| 213 | " | —N=N— phenyl-OC₂H₄OC₆H₅ | 5-OCH₃ | " | " | " | " | " | " |
| 214 | 2-CH₃ | OC₂H₄OC₆H₅ | H | 2-Br | 6-Br | " | " | OC₂H₄C₆H₅ | orange brownish |
| 215 | " | OC₂H₄C₆H₅ | " | " | " | " | " | OC₂H₄C₆H₅ | yellow brownish |
| 216 | " | " | " | 2-Cl | 5-Cl | " | " | " | yellow brownish |
| 217 | " | OC₂H₄OC₆H₅ | " | " | 6-Cl | " | " | OC₂H₄OC₆H₅ | yellow brownish |
| 218 | " | O(C₂H₄O)₂C₆H₅ | " | " | 5-Cl | " | " | O(C₂H₄O)₂C₆H₅ | yellow brownish |
| 219 | 2-OCH₃ | —N=N— phenyl(CH₃)-OC₂H₄OC₆H₅ | 5-OCH₃ | 2-OCH₃ | 5-OCH₃ | " | " | OC₂H₄OC₆H₅ | orange |
| 220 | 3-CO₂CH₃ | —CO₂CH₃ | H | 2-OCH₃ | 5-CH₃ | 2-Cl | 5-Cl | " | brownish yellow |
| 221 | " | " | " | " | 5-OCH₃ | " | " | " | yellowish brown |

-continued

III $$\underset{T^2}{\overset{T^1}{\underset{4}{\overset{2}{\bigcirc}}}}\underset{T^3}{\overset{3}{\underset{5}{\overset{6}{}}}}-N=N-\underset{T^5}{\overset{T^4}{\underset{4}{\overset{2}{\bigcirc}}}}\underset{}{\overset{3}{\underset{5}{\overset{6}{}}}}-N=N-\underset{T^7}{\overset{T^6}{\underset{4}{\overset{2}{\bigcirc}}}}\underset{}{\overset{3}{\underset{5}{\overset{6}{}}}}-T^8$$

| Example | $T^1$ | $T^2$ | $T^3$ | $T^4$ | $T^5$ | $T^6$ | $T^7$ | $T^8$ | Hue |
|---------|-------|-------|-------|-------|-------|-------|-------|-------|-----|
| 222 | 3-OC$_2$H$_4$C$_6$H$_5$ | H | " | " | " | 2-CH$_3$ | H | OC$_2$H$_4$C$_6$H$_5$ | orange |
| 223 | 3-OC$_2$H$_4$OC$_6$H$_5$ | " | " | " | " | " | " | OC$_2$H$_4$OC$_6$H$_5$ | " |
| 224 | " | " | " | 2-CH$_3$ | 5-CH$_3$ | " | " | " | golden yellow |
| 225 | " | " | " | " | " | " | " | " | orange |
| 226 | 3-OC$_2$H$_5$ | " | " | 2-OCH$_3$ | 5-NHCOCH$_3$ | " | " | OC$_2$H$_5$ | yellowish brown |
| 227 | 3-OC$_2$H$_4$OC$_6$H$_5$ | " | " | " | " | 2-Cl | 5-Cl | OC$_2$H$_4$OC$_6$H$_5$ | brownish yellow |
| 228 | " | " | " | " | 5-OCH$_3$ | " | " | " | yellowish brown |
| 229 | " | " | " | 2-CH$_3$ | " | " | " | " | yellowigh brown |
| 230 | " | OC$_6$H$_5$ | " | " | " | " | " | OC$_2$H$_4$C$_6$H$_5$ | golden yellow |
| 231 | " | OC$_6$H$_4$-p-Cl | " | " | " | " | " | " | golden yellow |
| 232 | " | " | " | " | " | " | " | OC$_2$H$_4$OC$_6$H$_5$ | golden yellow |
| 233 | " | OC$_6$H$_5$ | " | " | 5-CH$_3$ | H | " | OC$_2$H$_4$C$_6$H$_5$ | golden yellow |
| 234 | " | OC$_6$H$_4$-p-Cl | " | " | " | " | " | " | golden yellow |
| 235 | " | " | " | " | " | " | " | OC$_2$H$_4$C$_6$H$_5$ | golden yellow |
| 236 | " | " | " | " | " | 2-Cl | 5-Cl | OC$_2$H$_4$OC$_6$H$_5$ | golden yellow |
| 237 | " | " | " | " | " | " | " | OC$_2$H$_4$C$_6$H$_5$ | golden yellow |
| 238 | " | " | " | " | " | 2-CH$_3$ | H | " | golden yellow |
| 239 | " | " | " | " | " | 2-C$_6$H$_5$ | " | " | golden yellow |
| 240 | " | " | " | " | " | " | " | OC$_2$H$_4$OC$_6$H$_5$ | golden yellow |
| 241 | " | " | " | " | " | 2-CH$_3$ | 5-Cl | " | golden yellow |
| 242 | " | OC$_6$H$_5$ | " | " | " | 2-Cl | " | " | golden yellow |
| 243 | " | " | " | " | " | " | " | OC$_2$H$_4$C$_6$H$_5$ | golden yellow |
| 244 | " | " | " | " | " | 2-C$_6$H$_5$ | H | " | golden yellow |
| 245 | " | " | " | " | " | " | " | OC$_2$H$_4$OC$_6$H$_5$ | golden yellow |
| 246 | " | " | " | " | " | 3-CH$_3$ | " | " | golden yellow |
| 247 | " | " | " | " | " | " | " | OC$_2$H$_4$C$_6$H$_5$ | golden yellow |

-continued

| Example | T¹ | T² | T³ | T⁴ | T⁵ | T⁶ | T⁷ | T⁸ | Hue |
|---------|----|----|----|----|----|----|----|----|-----|
| 248 | | | | | | H | | $OSO_2C_6H_5$ | golden yellow |
| 249 | " | " | " | " | 5-$OCH_3$ | " | " | " | golden yellow |
| 250 | " | " | " | " | " | 2-$CH_3$ | " | " | golden yellow |
| 251 | " | $OC_6H_4$—$Cl(p)$ | " | " | " | " | " | $OSO_2C_6H_4$—$CH_3(p)$ | golden yellow |
| 252 | " | " | " | 2-$OCH_3$ | " | " | " | " | golden yellow |
| 253 | " | $OC_6H_5$ | " | " | " | H | " | $OSO_2C_6H_5$ | orange |
| 254 | " | " | " | " | " | " | " | $OC_2H_4OC_6H_5$ | bright red |
| 255 | " | " | " | " | " | 2-$CH_3$ | " | $OC_2H_4OC_2H_4OC_6H_5$ | bright red |
| 256 | " | " | " | " | " | " | " | $OC_2H_4OC_6H_5$ | " |
| 257 | " | " | " | " | " | 3-$CH_3$ | " | $OC_2H_4OC_6H_5$ | " |
| 258 | " | " | " | " | " | 2-$C_6H_5$ | " | " | " |
| 259 | " | " | " | " | " | 2-Cl | 5-Cl | " | orange |
| 260 | " | " | " | " | " | H | H | " | bright red |
| 261 | " | $OC_6H_4$—$Cl(p)$ | " | " | " | " | " | " | orange |
| 262 | " | " | " | " | " | 2-$C_6H_5$ | " | $OC_2H_4C_6H_5$ | bright red |
| 263 | " | " | " | " | " | " | " | $OC_2H_4OC_6H_5$ | orange |
| 264 | " | " | " | " | " | 2-$CH_3$ | " | $OC_2H_4OC_6H_5$ | " |
| 265 | " | " | " | " | " | " | " | $OC_2H_4C_6H_5$ | bright red |
| 266 | " | " | " | " | " | 3-$CH_3$ | " | $OC_2H_4OC_6H_5$ | " |
| 267 | " | " | " | 2-$OC_2H_5$ | 5-$OC_2H_5$ | H | H | " | " |
| 268 | " | " | " | " | " | 2-Cl | " | $OC_2H_4OC_6H_5$ | bright red |
| 269 | " | " | " | " | " | 2-$C_6H_5$ | " | $OSO_2C_6H_5$ | orange |
| 270 | " | " | " | " | " | 3-$CH_3$ | " | " | " |
| 271 | " | " | " | " | " | H | 5-Cl | $OC_2H_4OC_6H_5$ | bright red |
| 272 | " | $OC_6H_5$ | " | " | " | " | H | " | " |
| 273 | " | " | " | " | " | " | " | " | " |
| 274 | " | " | " | " | " | 2-Cl | " | " | orange |
| 275 | " | " | " | " | " | 2-$C_6H_5$ | " | $OC_2H_4C_6H_5$ | bright red |
| 276 | " | " | " | " | " | 3-$CH_3$ | " | $OC_2H_4OC_6H_5$ | " |
| 277 | " | " | " | " | " | H | " | $OC_2H_4OC_2H_4OC_6H_5$ | " |
| 278 | " | " | " | " | " | " | " | $OSO_2$—$C_6H_4$—$CH_3(p)$ | " |
| 279 | " | " | " | " | " | " | " | $OSO_2$—$C_6H_4$—$CH_3(o.p.)$ | " |
| 280 | " | " | " | 2-NHCOCH₃ | 5-$OCH_3$ | " | " | $OC_2H_4OC_6H_5$ | reddish orange |
| 281 | 2-$OC_6H_5$ | H | H | 2-$CH_3$ | 5-$CH_3$ | " | " | $OC_2H_4C_6H_5$ | golden yellow |
| 282 | " | " | " | 2-$OCH_3$ | " | " | " | " | brownish yellow |
| 283 | " | " | " | " | 5-$OCH_3$ | " | " | $OC_2H_4OC_6H_5$ | bright red |

-continued

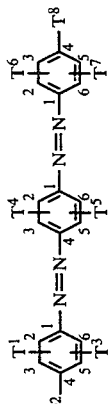

| Example | T¹ | T² | T³ | T⁴ | T⁵ | T⁶ | T⁷ | T⁸ | Hue |
|---|---|---|---|---|---|---|---|---|---|
| 291 | | | | | | 2-CH₃ | | OC₂H₄OC₆H₅ | bright red |
| 292 | " | " | " | " | " | " | " | OSO₂C₆H₅—CH₃(p) | orange |
| 293 | " | " | " | 2-OC₂H₅ | 5-OC₂H₅ | H | " | OC₂H₄OC₆H₅ | bright red |
| 294 | " | " | " | " | " | " | " | OC₂H₄C₆H₅ | " |
| 295 | " | " | " | " | 2-CH₃ | " | " | OC₂H₄OC₆H₅ | " |
| 296 | " | " | " | " | " | " | " | " | " |
| 297 | " | " | " | " | " | " | " | " | " |
| 298 | " | " | 5-Cl | 2-OCH₃ | 5-OCH₃ | H | " | OC₂H₄OC₆H₅ | bright red |
| 299 | " | " | " | " | " | " | " | OC₂H₄C₆H₅ | orange |
| 300 | " | " | " | " | " | H | H | OSO₂C₆H₅ | " |
| 301 | " | OCH₃ | " | 2-OC₂H₅ | 5-OC₂H₅ | 2-CH₃ | " | OSO₂C₆H₄—CH₃(p) | " |
| 302 | " | H | " | 2-OCH₃ | 5-OCH₃ | H | " | OC₂H₄C₆H₅ | " |
| 303 | " | " | " | " | 5-NHCOCH₃ | 2-C₆H₅ | " | " | " |
| 304 | " | OC₂H₅ | " | " | " | H | " | OC₂H₄C₆H₅ | orange |
| 305 | " | OC₂H₅ | " | " | " | " | " | OSO₂C₆H₄—CH₃(p) | bright red |
| 306 | " | " | " | " | 5-OCH₃ | " | " | OC₂H₄C₆H₅ | orange |
| 307 | " | " | " | 2-OC₂H₅ | 5-OC₂H₅ | 3-CH₃ | " | OC₂H₄OC₆H₅ | " |
| 308 | " | OCH₃ | " | 2-OC₂H₅ | 5-NHCOCH₃ | H | " | " | " |
| 309 | " | H | " | 2-OC₂H₅ | 5-OC₂H₅ | 2-CH₃ | " | " | " |
| 310 | " | OCH₃ | " | 2-OCH₃ | 5-NHCOCH₃ | " | " | " | " |
| 311 | " | N(CH₃)COCH₃ | " | " | 5-OCH₃ | " | " | " | " |
| 312 | " | " | " | " | " | " | H | OC₂H₄C₆H₅—CH₃(o,p) | bright red |
| 313 | " | " | " | " | " | " | " | OC₂H₄OC₆H₅ | " |
| 314 | 2-OCH₃ | " | " | " | " | " | " | " | " |
| 315 | H | " | " | " | " | " | " | " | bright red |
| 316 | " | " | " | " | " | " | " | " | " |
| 317 | " | " | " | 2-OC₂H₅ | 5-OC₂H₅ | 2-CH₃ | " | OC₂H₄OC₆H₅ | reddish orange |
| 318 | " | " | " | 2-OCH₃ | " | H | " | " | orange |
| 319 | " | " | " | 2-CH₃ | 5-CH₃ | 2-CH₃ | " | " | " |
| 320 | " | " | " | " | " | " | " | " | " |
| 321 | " | " | " | " | " | " | " | " | " |
| 322 | " | " | " | " | " | " | " | " | " |
| 323 | 3-NO₂ | H | " | 2-OCH₃ | " | " | " | OCH₂C₆H₅ | " |
| 324 | " | " | " | 2-CH₃ | " | " | " | OC₂H₄C₆H₅ | " |
| 325 | " | " | " | " | " | " | " | " | " |
| 326 | 3-NHCOCH₃ | " | " | 2-OCH₃ | " | " | " | OCH₂C₆H₅ | golden yellow |
| 327 | " | " | " | " | " | " | " | OC₂H₄C₆H₅ | " |
| 328 | " | " | " | " | " | " | " | " | orange |
| 329 | " | " | " | " | " | " | " | OCH₂C₆H₅ | golden yellow |
| 330 | " | " | " | " | " | 2-Cl | " | OC₂H₄OC₆H₅ | " |
| 331 | H | OCH₃ | " | 2-NHCOCH₃ | H | 2-CH₃ | 5-Cl | OC₂H₄C₆H₅ | " |
| 332 | " | " | " | " | " | " | " | " | " |

| Example | Formula | Hue |
|---|---|---|
| 333 | C6H5-N=N-(naphthalene)-N=N-(2-CH3-phenyl)-OCH2C(=O)-C6H5 | brownish orange |
| 334 | C6H5-N=N-(naphthalene)-N=N-(2-CH3-phenyl)-O(C2H4O)2C6H5 | " |
| 335 | C6H5-N=N-(naphthalene)-N=N-(2,6-di-CH3-phenyl)-OC2H7C6H5 | yellowish brown |
| 336 | C6H5-N=N-(naphthalene)-N=N-(2,6-di-CH3-phenyl)-OC2H7OC6H5 | " |
| 337 | C6H5-N=N-(naphthalene)-N=N-(2,5-di-Cl-phenyl)-O(C2H4O)2C6H5 | " |
| 338 | (2-CH3-C6H4)-N=N-(naphthalene)-N=N-(2-CH3-phenyl)-O(C2H4O)2C6H5 | brownish orange |
| 339 | C6H5-N=N-(naphthalene with OC2H5)-N=N-(2-CH3-phenyl)-OC2H4OC6H5 | orange brown |
| 340 | C6H5-N=N-(naphthalene with OCH3)-N=N-(2-CH3-phenyl)-OC2H4OC6H5 | " |
| 341 | C6H5-N=N-(naphthalene with OCH3)-N=N-(2-CH3-phenyl)-OC2H4OC6H5 | brownish orange |
| 342 | C6H5-N=N-(naphthalene with OC2H5)-N=N-(2-CH3-phenyl)-OC2H4OC6H5 | " |
| 343 | C6H5-N=N-(naphthalene with OC2H4OC6H5)-N=N-(2-CH3-phenyl)-OC2H4OC6H5 | " |
| 344 | (naphthalene with OC2H4OC6H5)-N=N-(OCH3, CH3-phenyl)-N=N-(2-CH3-phenyl)-OC2H4OC6H5 | yellowish brown |

-continued

| Example | Formula | Hue |
|---|---|---|
| 345 | C6H5—N=N—C6H4—N=N—(naphthyl)-OCH2C(O)C6H5 | orange |
| 346 | C6H5—N=N—C6H4—N=N—(naphthyl)-O(CH2CH2O)2C6H5 | " |
| 347 | (4-OCH3, 3-O2S—N(C2H5)2)C6H3—N=N—(2,5-diOCH3)C6H2—N=N—(naphthyl)-OC2H4C6H5 | reddish orange |
| 348 | C6H5—N=N—(naphthyl)—N=N—C6H4—OCH2C6H5 | orange |
| 349 | C6H5—N=N—(naphthyl)—N=N—C6H4—OC2H4OC6H5 | " |
| 350 | C6H5—N=N—(naphthyl)—N=N—C6H4—O(C2H4O)2C6H5 | " |
| 351 | C6H5—N=N—(naphthyl)—N=N—(2-CH3)C6H3—OC2H4C6H5 | brownish orange |
| 352 | C6H5—N=N—(naphthyl)—N=N—(2-CH3)C6H3—OC2H4OC6H5 | " |
| 353 | (3-OC2H4OC6H5)C6H4—N=N—(naphthyl)—N=N—(2-CH3)C6H3—OC2H4OC6H5 | orange |
| 354 | (4-OC2H4OC6H5)C6H4—N=N—(naphthyl)—N=N—C6H4—OC2H4OC6H5 | " |
| 355 | (4-OC2H4C6H5)C6H4—N=N—(naphthyl)—N=N—(2-CH3)C6H3—OC2H4OC6H5 | " |
| 356 | (4-OC2H4C6H5)C6H4—N=N—(naphthyl)—N=N—(2-CH3)C6H3—OC2H4C6H5 | " |
| 357 | (3-OC2H4C6H5)C6H4—N=N—(naphthyl)—N=N—(2-CH3)C6H3—OC2H4C6H5 | " |

| Example | Formula | Hue |
|---|---|---|
| 358 | 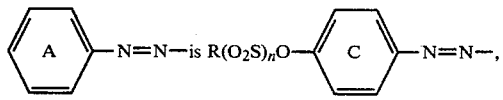 | yellowish brown |
| 359 | | " |
| 360 | | " |

EXAMPLE 361

A fabric consisting of 65 parts of polyester fibers and 35 parts of mercerized cotton is impregnated with a liquor which contains 70 g/l of a 20% strength aqueous formulation of a water-insoluble dispersed dye of the formula

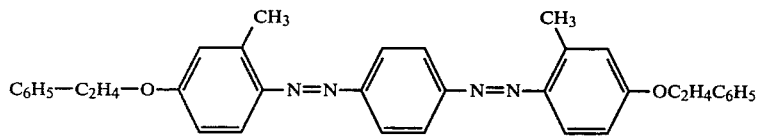

and 80 g/l of a swelling agent and dye solvent which comprises 80% of a polyethylene glycol of molecular weight 1,500 and 20% of a reaction product of 1 mole of hexamethylenediamine and 15 moles of ethylene oxide. The pH of the liquor is brought to 6 with citric acid. The impregnated fabric is dried for 60 seconds at 120° C. and is then additionally heated for 60 seconds at 215° C. to fix the dye. It is then rinsed cold and warm and soaped for 20 minutes at 100° C. in the presence of a commercial detergent. A golden yellow dyeing having very good lightfastness, washfastness and rubfastness is obtained.

We claim:

1. A process for dyeing cellulose-containing textile material which comprises contacting a cellulose-containing textile material with water and an oxyethylene or oxypropylene compound, thereby to swell the cellulose fibers of said textile material and dyeing said swollen fibers with a dye of formula I

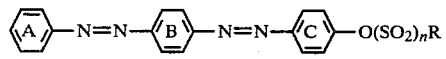     I where R is an aliphatic, cycloaliphatic, araliphatic or aromatic radical and n is 0 or 1, and where the rings A, B and C may be substituted and/or may carry a fused ring.

2. A process as claimed in claim 1, wherein a dye of the formula I where the radical

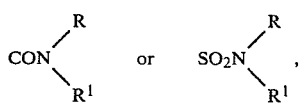

is used.

3. A process as claimed in claim 1, wherein a dye of the formula I is used, where the ring B is unsubstituted or is substituted by chlorine, methyl, acetylamino or $C_1$—$C_4$-alkoxy or carries a fused benzo ring.

4. A process as claimed in claim 1, wherein a dye of the formula I is used, where the ring C is unsubstituted or is substituted by chlorine, methyl, methoxy, ethoxy or phenyl.

5. A process as claimed in claim 1, wherein a dye of the formula I is used, where the ring A is unsubstituted or is substituted by chlorine, bromine, methyl, ethyl, methoxy, ethoxy, phenoxy, nitro, cyano, unsubstituted or methyl-, $O(SO_2)_nR$-, chlorine-, bromine-, nitro- or cyano-substituted phenylazo, methylsulfonyl, ethylsulfonyl, phenylsulfonyl, $SO_2OR$, $COOR$, $$CON\begin{matrix}R\\R^1\end{matrix} \quad \text{or} \quad SO_2N\begin{matrix}R\\R^1\end{matrix},$$

$R^1$ being hydrogen, $C_1$-$C_4$-alkyl or $C_1$-$C_4$-alkoxy-$C_2$-$C_3$-alkyl and n and R having the meanings given in claim 1.

6. A process as claimed in claim 1, wherein a dye of the formula I is used, where either n=0 and R is $C_1$-$C_{12}$-alkyl which is optimally interrupted by oxygen and is unsubstituted or is substituted by phenoxy, phenyl, tolyl or chlorophenyl, or n=1 and R has any of the above meanings or is unsubstituted or chlorine- or methyl-substituted phenyl.

7. A process as claimed in claim 1, wherein a dye of the formula

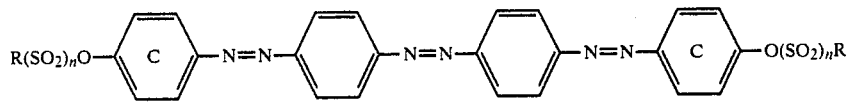
is used, where R and n have the meanings given in claim 1 or 6 and the rings C may be substituted.
8. A process as claimed in claim 1, wherein a dye of the formula
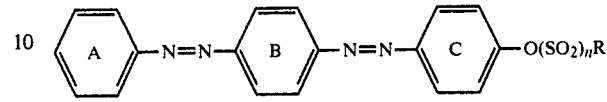
is used, where the rings A, B and C may be substituted and R is a radical containing a phenyl group.
9. Cellulosic textile material which has been dyed according to claim 1.
* * * * *